US006735862B1

(12) United States Patent
Glaser et al.

(10) Patent No.: US 6,735,862 B1
(45) Date of Patent: May 18, 2004

(54) METHOD OF MAKING ELECTRICAL CABLE

(75) Inventors: John Stanley Glaser, Niskayuna, NY (US); Judson Sloan Marte, Wynantskill, NY (US); Canan Uslu Hardwicke, Niskayuna, NY (US); Michael Andrew De Rooij, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/336,869

(22) Filed: Jan. 7, 2003

(51) Int. Cl.[7] ............................................ H01M 43/00

(52) U.S. Cl. ...................... 29/872; 241/433; 241/527.1; 241/868

(58) Field of Search ................................ 29/868, 527.1, 29/433, 241, 872

(56) References Cited

U.S. PATENT DOCUMENTS 4,095,326 A * 6/1978 Harvey
4,887,354 A * 12/1989 Van Der Maaden

* cited by examiner

*Primary Examiner*—Carl J. Arbes
(74) *Attorney, Agent, or Firm*—Jean K. Testa; Patrick K. Patnode

(57) ABSTRACT

A method of making an electrical cable, the method comprising: bonding a plurality of electrical conductors to respective neighboring ones of the electrical conductors to form a ribbon, the electrical conductors being electrically insulated from the respective neighboring ones; folding the ribbon to form cable assembly, each of the electrical conductors traversing the width of the cable assembly at least twice; optionally bonding the cable assembly; and optionally coiling the cable assembly.

40 Claims, 3 Drawing Sheets

100

METHOD OF MAKING ELECTRICAL CABLE

BACKGROUND

The present invention relates generally to the field of electrical cables and more specifically to the field of making litz wire.

In a wide variety of applications, litz wire (also called "litzendraht wire") is used to reduce the high frequency impedance of electrical cables. A typical litz wire consists of a number of individually insulated conductors woven together so that each conductor assumes all possible positions in the cross section of the assembly. This arrangement of the conductors tends to reduce high frequency eddy current effects, thereby resulting in lower high frequency impedance.

The woven litz wire, while providing high performance, is sometimes prohibitively expensive for some applications owing to difficulty in its manufacture. Opportunities exist, therefore, to reduce the cost of litz wire and expand the number of applications by finding an alternative, less costly method of manufacture.

SUMMARY

The opportunities described above are addressed, in one embodiment of the present invention, by a method of making an electrical cable, the method comprising: bonding a plurality of electrical conductors to respective neighboring ones of the electrical conductors to form a ribbon, the electrical conductors being electrically insulated from the respective neighboring ones; folding the ribbon to form a cable assembly, each of the electrical conductors traversing the width of the cable assembly at least twice; optionally bonding the cable assembly; and optionally coiling the cable assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
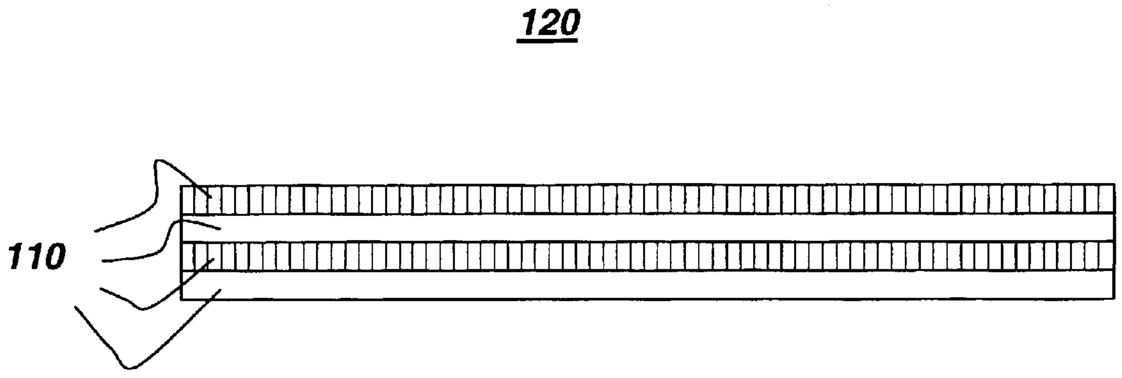
FIG. 1 illustrates an orthographic view of a ribbon in accordance with one embodiment of the present invention.
Figure 2:
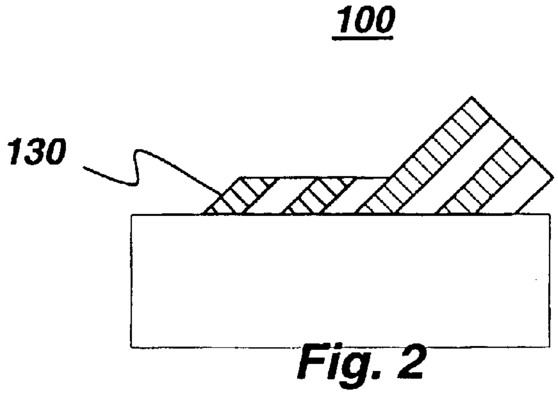
FIG. 2 illustrates an orthographic view of an electrical cable in accordance with the embodiment of FIG. 1.

In accordance with one embodiment of the present invention, FIG. 1 illustrates an orthographic view of a ribbon 120. A method of making an electrical cable starts by bonding a plurality of electrical conductors 110 to respective neighboring ones of electrical conductors 110 to form ribbon 120, where electrical conductors 110 are electrically insulated from their respective neighbors. Ribbon 120 is then folded as shown in FIG. 2 to form cable assembly 130. The folding is performed so that each of electrical conductors 110 traverses the width of cable assembly 130 at least twice. In some embodiments, electrical cable 100 is then completed by bonding cable assembly 130 to hold the folded shape. In some embodiments, such as, for example, in magnetic component applications, electrical cable 100 is completed by coiling cable assembly 130. In some embodiments, coiling cable assembly 130 is facilitated by bending cable assembly 130 to form corners during the act of folding.

In another embodiment of the present invention, cable assembly 130 is folded such that electrical conductors 110 do not describe spirals around cable assembly 130.

In another embodiment of the present invention, cable assembly 130 is folded lengthwise before bonding to produce a thicker cable.

Figure 3:
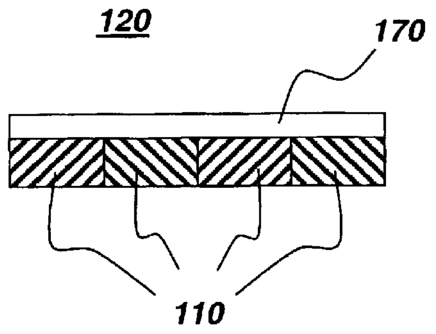
FIG. 3 illustrates an orthographic view of a ribbon in accordance with another embodiment of the present invention.

In another embodiment of the present invention, FIG. 3 illustrates a bonding layer 170 applied to ribbon 120 prior to folding. In some embodiments, bonding layer 170 is electrically insulating. Examples of bonding layer 170 include, without limitation, adhesives and curable polymers.

In another embodiment of the present invention, bonding layer 170 is cured by exposure to a bonding stimulus. Examples of bonding stimuli include, without limitation, electromagnetic radiation, mechanical stimuli, and chemical stimuli.

Figure 4:
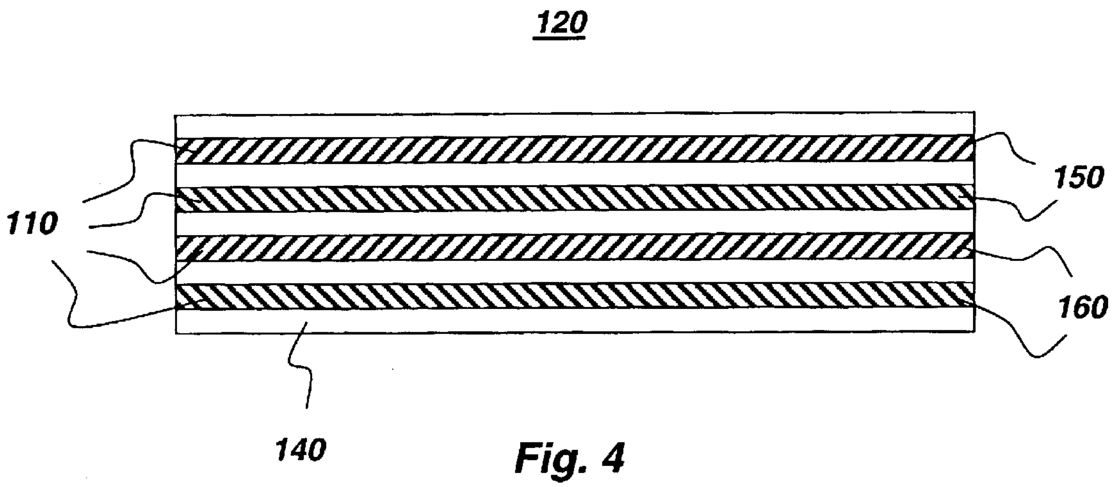
FIG. 4 illustrates an orthographic view of a ribbon in accordance with another embodiment of the present invention.

FIG. 4 illustrates ribbon 120 in accordance with another embodiment of the present invention. In the embodiment of FIG. 4, bonding each of electrical conductors 110 to a respective neighbor is accomplished by bonding the plurality of electrical conductors 110 to a common cable substrate 140. In some embodiments, cable substrate 140 is electrically insulating. In some embodiments, electrical conductors 110 are spaced apart from their respective neighbors.

In another embodiment, each of electrical conductors 110 has a non-rectangular cross section. By way of example, but not limitation, circular cross sections may be used. In some embodiments, ribbon 120 is further processed by being rolled flat prior to being folded.

In another embodiment, illustrated in FIG. 4, the capacitance of electrical cable 100 is influenced by selectively coupling electrical conductors 110. At a first end of cable assembly 130, a subset of electrical conductors 110 is electrically coupled to produce a first coupled subset 150, leaving an uncoupled remainder of electrical conductors 110. The uncoupled remainder of electrical conductors 110 are then electrically coupled at a second end of cable assembly 130 to produce a second coupled subset 160. In some embodiments, the first end and second end are at the same end of cable assembly 130. In other embodiments, the first end and second end are at opposite ends of cable assembly 130.

In another embodiment in accordance with the embodiment of FIG. 4, members of first coupled subset 150 have different respective lengths. Members of second coupled subset 160 have lengths in one-to-one correspondence with the different respective lengths of the members of first coupled subset 150. By varying the lengths of electrical conductors 110 in this embodiment, the capacitance is influenced as a function of length along electrical cable 100, thus influencing the lengthwise current distribution.

In another embodiment in accordance with the embodiment of FIG. 4, a first insulating gap is produced at a first gap location along the length of first coupled subset 150. In some embodiments, a second insulating gap is produced at a second gap location along the length of second coupled subset 160. The first and second insulating gaps also serve to alter overall cable capacitance.

In another embodiment in accordance with FIG. 4, electrical conductors 110 are bonded to opposite faces of cable substrate 140. In another embodiment, after folding, electrical conductors 110 are disposed on an outer surface of cable assembly 130.

Figure 5:
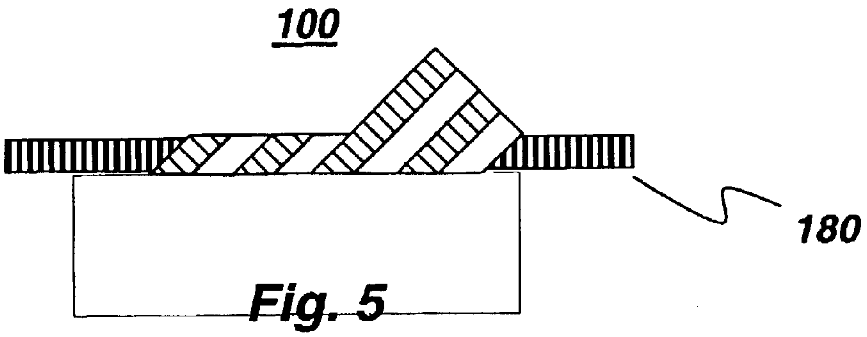
FIG. 5 illustrates an orthographic view of an electrical cable in accordance with another embodiment of the present invention.

FIG. 5 illustrates another embodiment wherein ribbon 120 is folded around an insulating strip 180.

Figure 6:
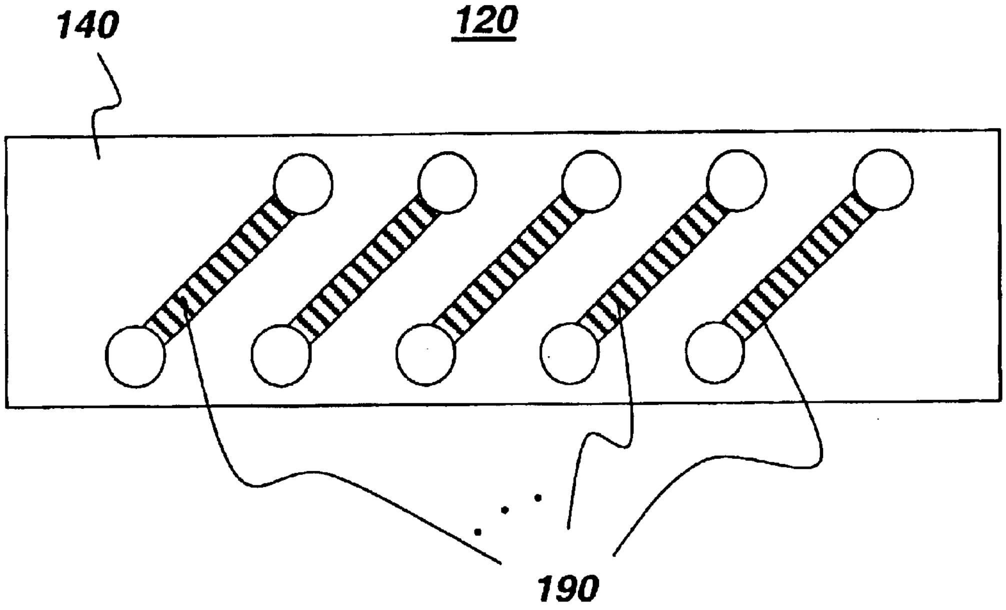
FIG. 6 illustrates an orthographic view of a ribbon in accordance with another embodiment of the present invention.

FIG. 6 illustrates another embodiment wherein electrical conductors 110 are formed into diagonal patterns 190. In another embodiment, diagonal patterns 190 are formed on opposite faces of cable substrate 140 with opposite face pairs of electrical conductors 110 being coupled through coupling holes in cable substrate 140. In another embodiment, opposite face pairs of electrical conductors 110 are coupled at the edges of substrate 140.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of making an electrical cable, said method comprising:

bonding a plurality of electrical conductors to respective neighboring ones of said electrical conductors to form a ribbon, said electrical conductors being electrically insulated from said respective neighboring ones;

folding said ribbon to form cable assembly, each of said electrical conductors traversing the width of said cable assembly at least twice;

electrically coupling at a first end of said cable assembly a subset of said electrical conductors to produce a first coupled subset leaving an uncoupled remainder of said electrical conductors; and electrically coupling at a second end of said cable assembly said uncoupled remainder of said electrical conductors to produce a second coupled subset;

optionally bonding said cable assembly; and optionally coiling said cable assembly.

2. The method of claim 1 wherein said act of folding said ribbon comprises bending said ribbon to form a corner.

3. The method of claim 1 further comprising folding lengthwise said cable assembly.

4. The method of claim 1 further comprising applying a bonding layer to said ribbon, said bonding layer being optionally electrically insulating.

5. The method of claim 1 wherein said act of bonding each of a plurality of electrical conductors comprises bonding said plurality of electrical conductors to a cable substrate.

6. The method of claim 5 wherein said cable substrate is electrically insulating.

7. The method of claim 5 wherein said plurality of electrical conductors are spaced apart from said respective neighboring ones.

8. The method of claim 5 wherein each of said plurality of electrical conductors has a non-rectangular cross section.

9. The method of claim 8 further comprising rolling flat said ribbon prior to said act of folding.

10. The method of claim 1 wherein said first end and said second end are at opposite ends of said cable assembly.

11. The method of claim 1 wherein:

members of said first coupled subset have different respective lengths; and members of said second coupled subset have lengths in one-to-one correspondence with said different respective lengths of said members of said first coupled subset.

12. The method of claim 1 further comprising producing a first insulating gap at a first gap location along the length of said first coupled subset.

13. The method of claim 12 further comprising producing a second insulating gap at a second gap location along the length of said second coupled subset.

14. The method of claim 5 wherein said act of bonding each of a plurality of electrical conductors comprises bonding said plurality of electrical conductors to opposite faces of said cable substrate.

15. The method of claim 5 wherein said electrical conductors are disposed on an outer surface of said cable assembly.

16. The method of claim 5 wherein said act of folding said ribbon comprises folding said ribbon around an insulating strip.

17. The method of claim 5 wherein said act of bonding a plurality of electrical conductors comprises forming said electrical conductors into diagonal patterns.

18. The method of claim 17 wherein said act of bonding a plurality of electrical conductors further comprises:

forming said diagonal patterns on opposite faces of said cable substrate;

electrically coupling opposite face pairs of said electrical conductors at edges of said cable substrate.

19. The method of claim 17 wherein said act of bonding a plurality of electrical conductors further comprises:

forming said diagonal patterns on opposite faces of said cable substrate;

forming coupling holes through said opposite faces of said cable substrate; and electrically coupling opposite face pairs of said electrical conductors through said coupling holes.

20. The method of claim 5 wherein said act of bonding a plurality of electrical conductors comprises depositing an electrically conducting ink on said cable substrate.

21. The method of claim 5 wherein said act of bonding a plurality of electrical conductors comprises:

depositing an electrically conducting layer on said cable substrate; and removing a quantity of said electrically conducting layer to leave said plurality of electrical conductors.

22. A method of making an electrical cable, said method comprising:

bonding a plurality of electrical conductors to a cable substrate, respective neighboring ones of said electrical conductors being spaced apart, to form a ribbon, said electrical conductors being electrically insulated from said respective neighboring ones;

folding said ribbon to form cable assembly, each of said electrical conductors traversing the width of said cable assembly at least twice;

electrically coupling at a first end of said cable assembly a subset of said electrical conductors to produce a first coupled subset leaving an uncoupled remainder of said electrical conductors; and electrically coupling at a second end of said cable assembly said uncoupled remainder of said electrical conductors to produce a second coupled subset;

optionally bonding said cable assembly; and optionally coiling said cable assembly.

23. The method of claim 22 wherein said act of folding said ribbon comprises bending said ribbon to form a corner.

24. The method of claim 22 further comprising folding lengthwise said cable assembly.

25. The method of claim 22 further comprising applying a bonding layer to said ribbon, said bonding layer being optionally electrically insulating.

26. The method of claim 22 wherein said cable substrate is electrically insulating.

27. The method of claim 22 wherein each of said plurality of electrical conductors has a non-rectangular cross section.

28. The method of claim 27 further comprising rolling flat said ribbon prior to said act of folding.

29. The method of claim 22 wherein said first end and said second end are at opposite ends of said cable assembly.

30. The method of claim 22 wherein:

members of said first coupled subset have different respective lengths; and members of said second coupled subset have lengths in one-to-one correspondence with said different respective lengths of said members of said first coupled subset.

31. The method of claim 22 further comprising producing a first insulating gap at a first gap location along the length of said first coupled subset.

32. The method of claim further comprising producing a second insulating gap at a second gap location along the length of said second coupled subset.

33. The method of claim 22 wherein said act of bonding each of a plurality of electrical conductors comprises bonding said plurality of electrical conductors to opposite faces of said cable substrate.

34. The method of claim 22 wherein said electrical conductors are disposed on an outer surface of said cable assembly.

35. The method of claim 22 wherein said act of folding said ribbon comprises folding said ribbon around an insulating strip.

36. The method of claim 22 wherein said act of bonding a plurality of electrical conductors comprises forming said electrical conductors into diagonal patterns.

37. The method of claim 36 wherein said act of bonding a plurality of electrical conductors further comprises:

forming said diagonal patterns on opposite faces of said cable substrate;

electrically coupling opposite face pairs of said electrical conductors at edges of said cable substrate.

38. The method of claim 36 wherein said act of bonding a plurality of electrical conductors further comprises:

forming said diagonal patterns on opposite faces of said cable substrate;

forming coupling holes through said opposite faces of said cable substrate; and electrically coupling opposite face pairs of said electrical conductors through said coupling holes.

39. The method of claim 22 wherein said act of bonding a plurality of electrical conductors comprises depositing an electrically conducting ink on said cable substrate.

40. The method of claim 22 wherein said act of bonding a plurality of electrical conductors comprises:

depositing an electrically conducting layer on said cable substrate; and removing a quantity of said electrically conducting layer to leave said plurality of electrical conductors.

* * * * *